United States Patent [19]

Van Blunk

[11] Patent Number: 4,830,298

[45] Date of Patent: May 16, 1989

[54] SELF-CENTERING SHEAVE FOR FILAMENTS

[75] Inventor: J. J. Van Blunk, Glenolden, Pa.

[73] Assignee: The Boeing Company, Seattle, Wash.

[21] Appl. No.: 221,018

[22] Filed: Jul. 18, 1988

Related U.S. Application Data

[63] Continuation of Ser. No. 913,422, Sep. 30, 1986, abandoned.

[51] Int. Cl.⁴ .................... B65H 54/64; B65H 57/16; B65H 57/18; B65H 57/28
[52] U.S. Cl. .................................... 242/7.21; 242/42; 242/157 R
[58] Field of Search ............... 242/7.21, 7.22, 7.23, 242/7.01, 7.11, 18 G, 18 R, 42, 35.5 R, 157 R, 157.1; 254/394, 398, 412, 415; 57/13; 226/196, 199

[56] References Cited

U.S. PATENT DOCUMENTS

| | | | |
|---|---|---|---|
| 1,275,887 | 8/1918 | Finnell | 242/157 R |
| 1,509,711 | 9/1924 | Chapman | 254/394 |
| 1,943,433 | 1/1934 | Heighton | 254/415 X |
| 2,581,298 | 1/1952 | Roe | 254/415 |
| 2,589,544 | 3/1952 | Ginter | 242/157 R |
| 2,770,499 | 11/1956 | Rapisarda | 242/157 R |
| 3,485,458 | 12/1969 | Evans | 242/157 X |
| 4,437,601 | 3/1984 | Brooks | 242/157 R X |
| 4,533,089 | 8/1985 | Sartor et al. | 242/157 R X |
| 4,610,402 | 9/1986 | Corbett et al. | 242/157 R X |

FOREIGN PATENT DOCUMENTS 452872  9/1936  United Kingdom ............... 254/394

Primary Examiner—Stanley N. Gilreath
Attorney, Agent, or Firm—Jones, Tullar & Cooper

[57] ABSTRACT

Antifriction sheaves, or pulley assemblies, are mounted in a bearing plate to form a filament guide for a winding machine. The pulley assemblies each comprise a bearing disk mounted in the bearing plate for pivotal motion about an axis perpendicular to the bearing plate, and a pulley wheel mounted in, and passing through, the bearing disk.

3 Claims, 2 Drawing Sheets

SELF-CENTERING SHEAVE FOR FILAMENTS

This is a continuation of copending application Ser. No. 913,422 filed on Sept. 30, 1986 now abandoned.

BACKGROUND OF THE INVENTION

The present invention relates, in general, to filament winding machines such as those used for the production of glass fiber products such as cylindrical casings, and more particularly relates to an improved guide structure for guiding filaments from a plurality of spools to form a multi-filament strand.

In automatic winding machines, it is known to provide a plurality of feed spools of filamentary material such as glass fibers which are gathered into a strand for use in laying up a fiberglass product such as a cylindrical casing or the like. In one such arrangement, the several spools are secured to a mounting plate which, in turn, is affixed to a support beam that is movable along three axes. The mounting plate carries a filament guide through which the filaments from each of the spools is directed. Normally, this guide is located centrally of all of the spools and gathers the filaments so that they can be drawn as a multi-filament strand through suitable eyes, or bushings, to a winding foot which is then controllable to guide the strand onto and around a suitable form. Motion of the mounting plate and of the winding foot is controlled to move the strand along a desired winding path to form the desired wound product.

One such filament guide in current use in such machines is of a simple annular shape and is supported generally horizontally below the mounting plate approximately in the center of the multiple feed spools. The individual filaments are drawn from the corresponding spools through the central aperture of the guide, and from the guide through a pulley or bushing beneath and to one side of the filament guide. Although such a guide serves to gather the filaments in the required manner, problems are encountered with this arrangement, since the filaments used in such a winding machine typically are impregnated with a bonding material, and as a result the surfaces of the filaments are rough and abrasive. Since the filaments may move at a relatively high speed through the filament guide, the rough filament surfaces cause excessive wear on the guide and produce an excessive and variable tension on the filaments as they are drawn off of the spools. Further, since the filaments are initially wound on the spools to form filament packages by the use of traversing feeders, which travel from one end of the spool to the other as the spool rotates, the filament which is drawn from the spool to the winding machine therefore also traverses from one end of the spool to the other repeatedly during the unwinding operation. This causes the filament to be continuously changing direction as it is fed to the guide and, in addition, the distance between the filament guide and the takeoff point on the spool is continuously changing. This causes the tension on the filaments to vary cyclically as it is fed, with each filament from its individual spool varying in a similar manner, but from different directions and at different rates, which depend upon the diameter of the spool, the tightness with which the filament was originally wound, and other variables. These changes in filament tension produce a strand which is not consistent in its characteristics, since each element in the strand maybe supplied to the product being wound at a different tension. Furthermore, the high tension caused by the abrasive material impregnated in the filaments can cause breakage of the individual filaments, and together these problems result in improper strand placement on the product being wound, and can, in addition, result in machine failure.

BRIEF DESCRIPTION OF THE INVENTION

It is an object of the present invention to provide a guide mechanism for reducing strand tension in filament winding machines.

It is another object of the invention to provide apparatus for reducing the wearing effects of abrasive filaments in a filament guide mechanism.

It is a further object of the present invention to provide apparatus for reducing variations in strand tension due to the traverse of filaments during feeding from an elongated spool.

It is another object of the present invention to provide guide apparatus responsive to the traversing motion of multiple filaments fed from supply spools.

Briefly, the present invention is directed to filament gathering apparatus for combining a plurality of individual filaments into a loosely defined strand which may then be supplied by suitable automatic winding apparatus to a work Stanton. The filament gathering apparatus receives individual filaments drawn from different and varying directions, responding to the differing directions so as to supply the filaments to the strand at a substantially constant tension. The gathering apparatus further is constructed to reduce the tension on individual strands due to the surface characteristics of the strands themselves, so that rough or abrasive filament surfaces not only do not adversely affect the tension of the filament in a strand, but further reduces or eliminates the wear problem that has been encountered in the past with abrasive filaments.

The foregoing advantages are provided by means of a filament guide including a bearing plate carrying a plurality of self-centering sheaves, or pulley assemblies, one for each filament to be drawn from a spool. The sheaves are free turning pulleys having their shafts mounted in bearing disks which, in turn, are pivotally supported in the common bearing plate. One pulley assembly is provided for each filament, the filament passing over the rotatable pulley and through the bearing plate to essentially eliminate the friction caused by rough-surfaced filaments. Furthermore, the pivotal disk for each assembly turns the pulley and its shaft to keep the filament aligned with the center line of the pulley as the filament traverses back and forth across the length of its supply spool. Each filament from each spool is fed to an individual, corresponding pulley so that the several filaments are drawn with a substantially equal tension to thereby form a more uniform strand and to insure proper filament and strand placement on the product being wound.

BRIEF DESCRIPTION OF THE DRAWINGS

The foregoing and additional objects, features and advantages of the present invention will become apparent to those of skill in the art from a consideration of the following detailed description of a preferred embodiment thereof, taken in conjunction with the accompanying drawings, in which.

DESCRIPTION OF THE PREFERRED EMBODIMENT

Figure 1:
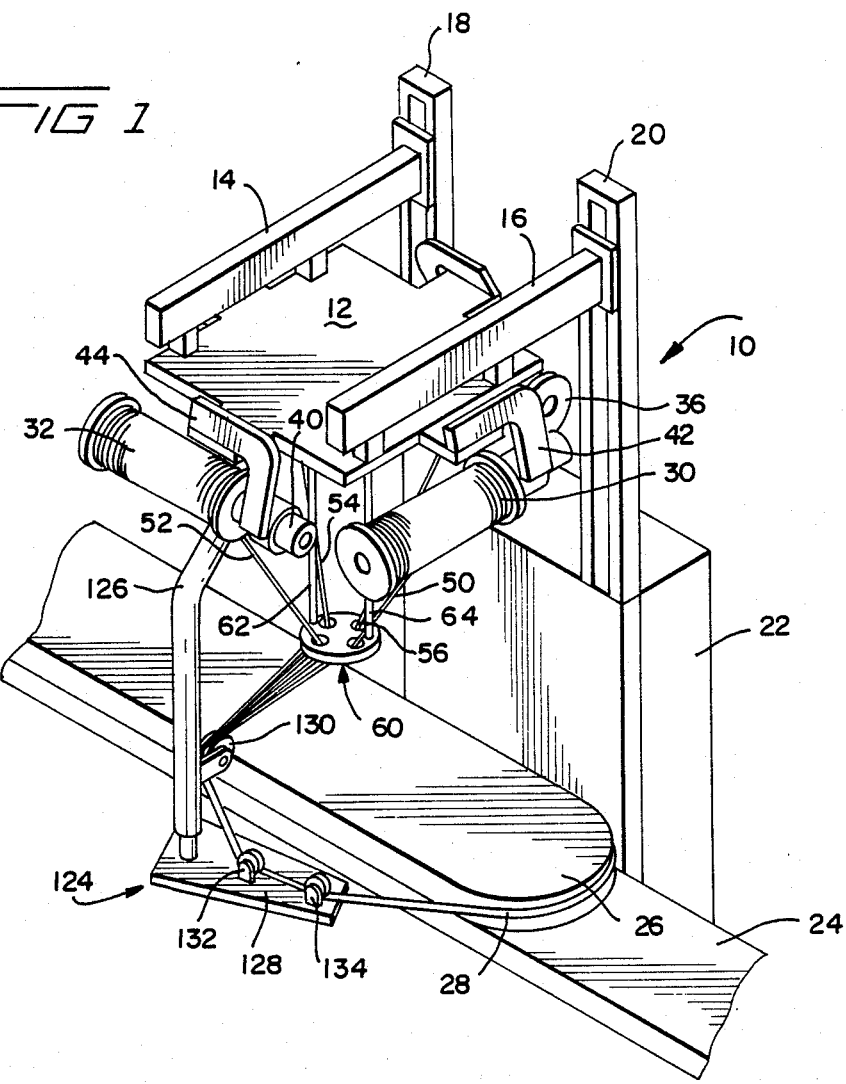
FIG. 1 is a perspective view of a conventional automatic winding machine utilizing the filament guide of the present invention.

Turning now to a more detailed consideration of the present invention, there is diagrammatically illustrated at 10 a winding head for an automatic winding machine of conventional design. The winding head includes a support plate 12 mounted to a pair of support beams 14 and 16 which are carried by vertical tracks 18 and 20, respectively. The tracks 18 and 20 provide vertical motion for the support beams 14 and 16, while horizontal motion for the winding head is provided by a carriage 22 mounted for motion along X and Y axes adjacent a work table 24. The table 24 may carry a workpiece 26 such as a winding mandrel, or core, around which a glass fiber strand or tape 28 is to be wound by the winding head 10 in accordance with techniques which are well known in the art.

Figures 3, 4:
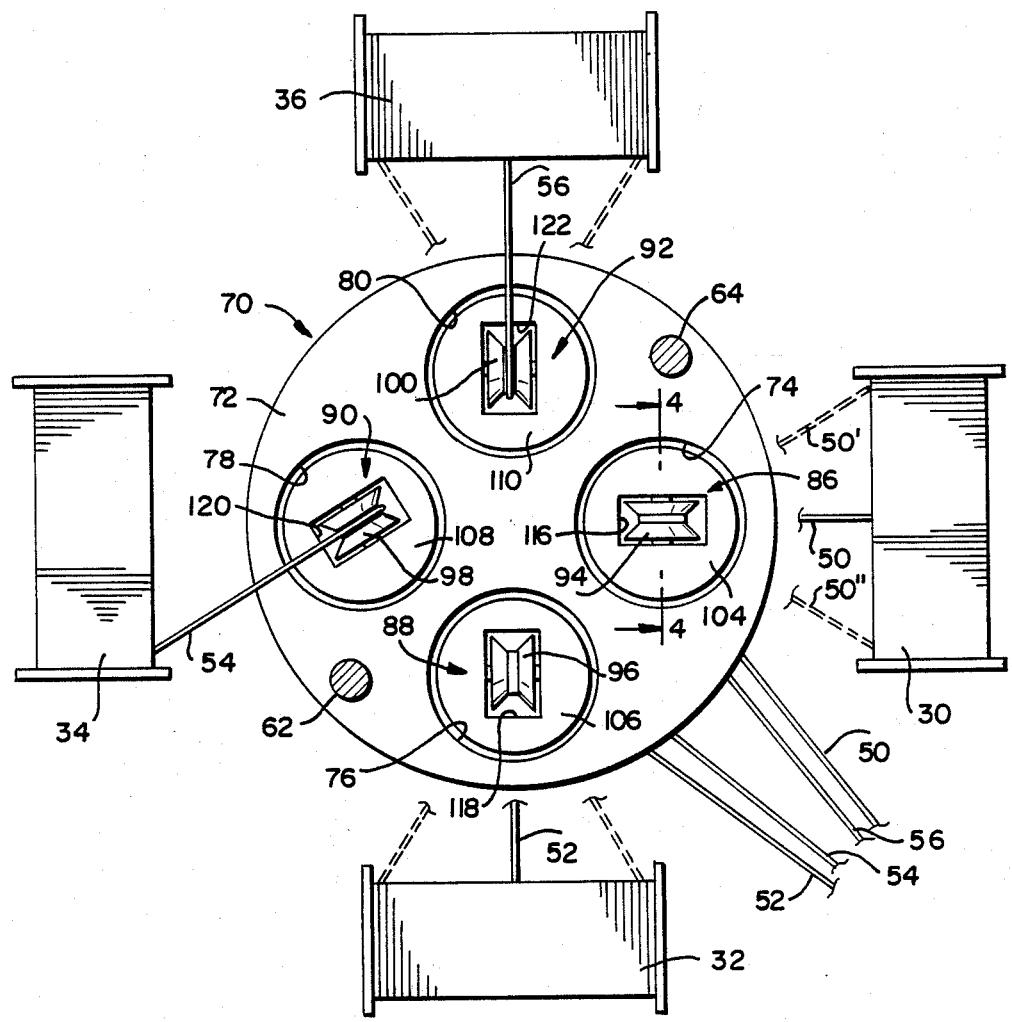
FIG. 3 is a top plan view of the filament guide of the present invention with four filament supply spools and four self-centering sheaves.
FIG. 4 is a sectional view of a self-centering sheave taken along line 4—4 of FIG. 3.

The mounting plate 12 supports a plurality of filament supply spools illustrated in FIGS. 1 and 3 at 30, 32, 34 and 36. The spools are mounted on horizontal shafts, such as that illustrated at 40 in FIG. 1, the shafts being secured to the mounting plate by means of corresponding mounting arms, two of which are illustrated at 42 and 44 in FIG. 1. The spool shafts 40 carry suitable brakes to restrain the rotation of their corresponding spools so as to maintain a constant tension on filaments drawn from the spools, again as is well known in the art.

Each spool carries a filament package in which a filament, which may, for example, be made up of one or more glass fibers impregnated with a bonding material is wound on the spool in conventional manner by a traversing winder. Such a winder feeds the filament onto the spool with an end-to-end motion along the length of the spool to thereby distribute the filament evenly as the spool package is wound.

One or more filament spools are placed on the winding head 10, the illustrated embodiment showing four spools 30, 32, 34 and 36 being utilized, and the filaments 50, 52, 54 and 56, respectively, from the spools are then gathered to form the strand 28 As they are drawn from their respective spools, the filaments traverse along the length of the spools, for example from the position 50' to the position 50" as illustrated for spool 30.

The filaments are directed through a filament guide generally indicated at 60 in FIG. 1, the guide being supported by means of tie rods 62 and 64 which are connected at their upper ends to the support plate 12. The filament guide 60 is supported at a location generally below the level of the filament spools 30, 32, 34 and 36, and preferably is centrally located on the support plate so as to be of equal distance from all of the spools.

Figure 2:
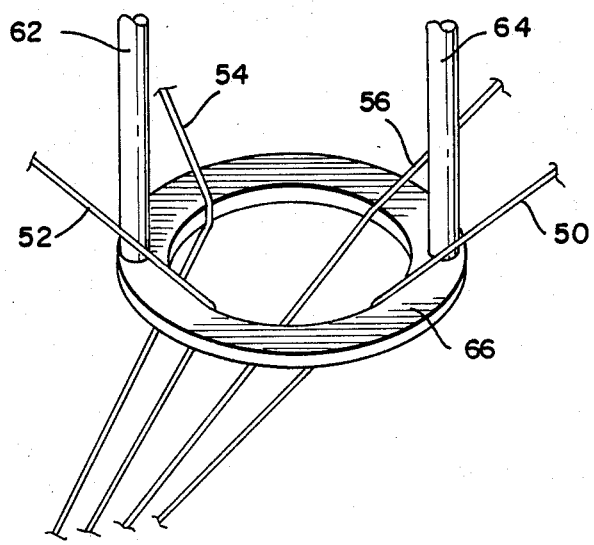
FIG. 2 is a perspective view of a prior art filament guide.

Filament guides such as that illustrated at 60 in FIG. 1 have, in the past, been in the form of an annular ring 66 of the type illustrated in FIG. 2. However, because of the abrasive nature of the bonding material impregnating the filaments and because of the traversing path of the filaments as they are drawn from their respective spools, filament guides of the type illustrated in FIG. 2 have experienced excessive wear and, as outlined hereinabove, the filaments drawn through such guides have experienced wide fluctuations in tension. Such variations, which are due to the different paths followed by the strands, by changes in those paths, and by variations in roughness and abrasiveness of the filaments, have adversely affected the end product being produced by the winding of the strand, and thus have been unsatisfactory. Alternative forms of filament guides provide a single annular ring, of the type illustrated at 66, for each individual fiber, but such individual guides do not solve the problem, for they do not accommodate to changing directions of the filament, and produce excessive tension because of the abrasive nature of the filaments.

The foregoing problems are overcome, in accordance with the present invention, by the filament guide 70 which is illustrated in FIG. 3. This guide includes a flat bearing plate 72 which may be of any desired geometrical shape, but which is cylindrical in the illustrated embodiment. The bearing plate is secured to the mounting plate 12 by means of tie rods 62 and 64, as previously discussed. Formed in the bearing plate 72 are a plurality of bearing apertures 74, 76, 78 and 80, which pass completely through the bearing plate 72, as illustrated in FIG. 4. Each bearing aperture is partially closed at the bottom of the plate 72 by means of an annular shoulder, illustrated at 82 in FIG. 4 for aperture 74, with each of the shoulders defining an upper annular bearing surface 84. Each of the apertures 74, 76, 78 and 80 receives a sheave, or pulley assembly, such as the assemblies indicated in FIG. 3 at 86, 888, 90 and 92. The pulley assemblies incorporate pulley wheels 94, 96, 98 and 100, respectively, each mounted by means of a shaft, such as that illustrated at 102 in FIG. 4, in a corresponding one of bearing disks 104, 106, 108 and 110. The disk 104 is mounted in aperture 74 with its bottom surface 112 resting on the top bearing surface 84 formed by shoulder 82, and with the side wall 114 of aperture 74 maintaining the disk centered within the aperture and providing a bearing surface for the disk. In similar manner the remaining disks are mounted in their corresponding apertures. Each of the disks 104, 106, 108 and 110 incorporates a central pulley opening, illustrated at 116, 118, 120 and 122, respectively, through which the respective pulley wheels extend to carry the filaments through the bearing plate 72, as illustrated in FIG. 4. Accordingly, the disks, when mounted in their respective apertures, are each pivotable about an axis which is perpendicular to the plane of the surface of bearing plate 72. The disks also support the respective pulley shafts so that each pulley rotates in a plane which is parallel to the axis of the disk in which it is mounted.

The disks are formed of a suitable bearing material, such as nylon or metal coated with tetrafluoroethylene (Teflon), so they are easily pivotable in their apertures. If desired, ball bearings or the like may be provided in suitable bearing races, although the preferred form is as illustrated. Furthermore, a suitable retaining cover may be placed on the top of bearing plate 72, if desired, to secure the bearing assemblies 86, 88, 90 and 92 in their respective apertures.

In operation, the bearing plate with its pulley assemblies is mounted by means of tie rods 62 and 64 to the support plate 12, and is located centrally of the filament supply spools 30, 32, 34 and 36. The bearing plate is positioned so that each of the pulley assemblies 86, 88, 90 and 92 is aligned with a corresponding one of the spools 30, 32, 34 and 36 so that the filaments from each of the spools will feed through a corresponding pulley. Thus, filament 50 is fed through pulley 94, the filament passing over the top of bearing plate 72, over the pulley 94 and down through the aperture 74 to the bottom of bearing plate 72. Similarly, filament 52 is threaded across the top of bearing plate 72, over pulley 96 and down through aperture 76 to the bottom of the bearing plate. Filament 54 is fed across the top of plate 72, over pulley 98 and down through aperture 78, and filament 56 is fed across plate 72, over pulley 100 and down through aperture 80. As the filaments are pulled through the apertures, the pulleys 94, 96, 98 and 100 rotate so that the filaments do not have to pass over a stationary surface, thereby reducing significantly the tension induced in the filaments by the filament guide 70. Furthermore, as each filament traverses across its supply spool as the filament is unwound, and the direction of the filament with respect to its pulley changes, as indicated by the dotted lines 50' and 50'', the pulley assemblies pivot in the bearing plate 72, as indicated by the assembly 90, so that each pulley remains aligned with its filament. The pivotal motion of the assembly follows the traversing motion of the filament across the corresponding spool, thereby preventing the variations in tension which were previously imposed on the filament due to changes in direction of the feed. Thus, the pulley assembly centers itself on the moving filament, and maintains a constant tension as the filament unwinds. It will be noted that as the diameter of the supply spool changes, the angle of the filament with respect to the guide 70 will change, but this change in angle is accommodated by the pulley so that it does not adversely effect the operation of th device.

The filaments 50, 52, 54 and 56 are gathered together to form strand 28 after they pass through the filament guide 60, and, as illustrated in FIG. 1, may be directed to a winding foot generally indicated at 124 which guides the strand to the workpiece 26. The winding foot is mounted on a support arm 126 secured to mounting plate 12 and extending downwardly below the mounting plate to a shoe 128 which is controllable to position the strand during the winding process. The strand may be directed to, and along, the shoe 128 by way of a pulley 130 mounted on arm 126 and pulleys 132 and 134 mounted on shoe 128. It will be understood that as the winding assembly 10 moves with respect to the workpiece 26, the strand 28 is positioned on the workpiece, with the motion of the winding head drawing the strand, and thus the filaments 50, 52, 54 and 56, from their respective supply spools. By use of the guide 70 of the present invention, the individual filaments are drawn smoothly and with a substantially constant tension so that the strand is uniform and is properly placed on the workpiece.

Although the present invention has been described in terms of filaments, it will be understood that other materials, such as glass fiber tapes, can be substituted therefore and equally well may be fed through corresponding self-centering pulley assemblies in the guide 70. Numerous other variations and modifications may be made without departing from the true spirit and scope of the invention, as set forth in the following claims:

What is claimed is:

1. The combination of at least one filament supply spool mounted to rotate about a filament supply spool axis, from which a filament is drawn and in the process reciprocally traverses the filament supply spool in the direction of the filament supply spool axis, and a self-aligning filament guide, said self-aligning filament guide comprising:

a bearing plate having a through aperture and associated pulley assembly corresponding to each filament supply spool, each pulley assembly being pivotably mounted in a corresponding aperture in said bearing plate for pivotal motion relative to said bearing plate about an axis perpendicular to said bearing plate, wherein:

each pulley assembly comprising a bearing disk mounted in its corresponding aperture in said bearing plate for pivotal motion about said axis perpendicular to said bearing plate, said bearing disk including a central opening, an a pulley wheel mounted in the central opening of its bearing disk for rotation about an axis which intersects said axis perpendicular to said bearing plate; and each pulley assembly is aligned with its corresponding filament supply spool and pivotal in order to follow the traversing motion of the filament from the corresponding filament supply spool.

2. The combination as defined in claim 1, further wherein:

each through aperture includes a side wall and an annular bottom bearing wall for receiving a bearing disk.

3. The combination as defined in claim 1, further comprising:

support means for supporting a plurality of filament supply spools; and further support means for supporting said bearing plate relative to said plurality of filament supply spools, said bearing plate having a through aperture and associated pulley assembly situated adjacent to its corresponding filament supply spool.

* * * * *